(12) United States Patent
Sohn et al.

(10) Patent No.: US 8,723,411 B2
(45) Date of Patent: May 13, 2014

(54) PHOTOLUMINESCENT SHEET

(75) Inventors: Choong-Yong Sohn, Cheongju-si (KR); Young-Joo Ahn, Ansan-si (KR); Young-Wook Ko, Seo-gu (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/541,072

(22) Filed: Jul. 3, 2012

(65) Prior Publication Data

US 2012/0267998 A1 Oct. 25, 2012

Related U.S. Application Data (63) Continuation of application No. 12/282,973, filed as application No. PCT/KR2006/004389 on Oct. 26, 2006, now Pat. No. 8,237,352.

(30) Foreign Application Priority Data

Mar. 15, 2006 (KR) .................. 10-2006-0023832

(51) Int. Cl.
  *H01L 27/32* (2006.01)
  *H01L 51/50* (2006.01)

(52) U.S. Cl.
  USPC .................... 313/503; 313/501; 313/502

(58) Field of Classification Search
  USPC .................................... 313/498–512
  See application file for complete search history.

(56) References Cited

U.S. PATENT DOCUMENTS

| | | | |
|---|---|---|---|
| 4,927,681 A | 5/1990 | Chikuma | |
| 6,066,861 A | 5/2000 | Höhn et al. | |
| 6,395,408 B1 | 5/2002 | Nelson et al. | |
| 6,504,301 B1 | 1/2003 | Lowery | |
| 6,569,786 B1 | 5/2003 | Marsh | |
| 6,635,363 B1 * | 10/2003 | Duclos et al. | 428/690 |
| 7,239,080 B2 | 7/2007 | Ng et al. | |
| 7,431,864 B2 | 10/2008 | Hirosaki | |
| 2002/0080501 A1 | 6/2002 | Kawae et al. | |
| 2002/0185965 A1 | 12/2002 | Collins, III et al. | |
| 2004/0070338 A1 | 4/2004 | Noguchi et al. | |
| 2004/0094757 A1 | 5/2004 | Braune et al. | |

(Continued)

FOREIGN PATENT DOCUMENTS

| | | |
|---|---|---|
| EP | 0936682 A1 | 8/1999 |
| EP | 1081771 A2 | 3/2001 |

(Continued)

OTHER PUBLICATIONS

Office Action dated Nov. 13, 2012 in Japanese Application No. 2009-500274, filed Oct. 26, 2006.

(Continued)

*Primary Examiner* — Karabi Guharay
*Assistant Examiner* — Nathaniel Lee
(74) *Attorney, Agent, or Firm* — Saliwanchik, Lloyd & Eisenschenk (57) ABSTRACT

A photoluminescent sheet is disclosed. A photoluminescent sheet that includes a matrix resin layer, which is a thermosetting resin; a phosphor, which is included in the matrix resin layer and which converts the wavelength of light emitted from a blue LED; a curing agent, which is included in the matrix resin layer and which cures liquid thermosetting resin; and an additive, which is included in the matrix resin layer and which disperses the phosphor uniformly within the matrix resin layer, can implement white light from light having wavelengths corresponding to blue color.

19 Claims, 5 Drawing Sheets

(56) References Cited

U.S. PATENT DOCUMENTS

| | | |
|---|---|---|
| 2005/0221518 A1 | 10/2005 | Andrews et al. |
| 2005/0287687 A1 | 12/2005 | Liao et al. |
| 2007/0004065 A1* | 1/2007 | Schardt et al. ................. 438/26 |
| 2007/0013291 A1* | 1/2007 | Cok et al. ..................... 313/501 |

FOREIGN PATENT DOCUMENTS

| | | |
|---|---|---|
| EP | 1198016 A2 | 4/2002 |
| EP | 1220332 A2 | 7/2002 |
| JP | 11-500584 A | 1/1999 |
| JP | 11-199781 A | 7/1999 |
| JP | 2001-111117 A | 4/2001 |
| JP | 2001-345482 A | 12/2001 |
| JP | 2002-190622 A | 7/2002 |
| JP | 2005-093256 A | 4/2005 |
| JP | 2005-191197 A | 7/2005 |
| JP | 2005-260229 A | 9/2005 |
| JP | 2005-327777 A | 11/2005 |
| KR | 2003-0095900 A | 12/2003 |
| KR | 10-2004-0044701 A | 5/2004 |
| KR | 10-2006-0024545 A | 3/2006 |
| WO | WO-97/50132 A1 | 12/1997 |
| WO | WO-2005/043631 A2 | 5/2005 |
| WO | WO-2006/016711 A1 | 2/2006 |

OTHER PUBLICATIONS

Office Action dated Sep. 3, 2013 in Japanese Application No. 2009-500274, filed Oct. 26, 2006.

Supplementary European Search Report dated Oct. 17, 2011 in European Application No. 06812231.6 dated Oct. 26, 2006.

Office Action dated Feb. 21, 2012 in Japanese Application No. 2009-500274, filed Oct. 26, 2006.

* cited by examiner

PHOTOLUMINESCENT SHEET

CROSS-REFERENCE TO RELATED APPLICATIONS

This application is a continuation of U.S. application Ser. No. 12/282,973, filed Sep. 15, 2008, which is the U.S. national stage application of International Patent Application No. PCT/KR2006/004389, filed Oct. 26, 2006, which claims priority to Korean Patent Application No. 10-2006-0023832, filed Mar. 15, 2006, all of which are incorporated herein by reference in their entirety.

TECHNICAL FIELD

The present invention relates to a photoluminescent sheet, more particularly, to a photoluminescent sheet capable of implementing white light from the blue light of an LED (light emitting diode).

BACKGROUND ART

Various types of lighting equipment are used for providing light in the nighttime or in an indoor space and for spotlighting objects. Such lighting equipment provides light by receiving electrical energy from an electrical power source and converting it to light energy, where incandescent light bulbs or fluorescent tubes are generally used. However, incandescent light bulbs and fluorescent tubes entail high power consumption and heat emission, and due to their short durability of about six months, there is a need for frequent replacement.

In addition, fluorescent tubes use mercury, which is a carcinogenic substance, and may thus be subject to regulations, and when fluorescent tubes are used for direct lighting, the flickering of the light source may cause weakened eyesight. There are also several other drawbacks, including the requirement of large installation spaces, and difficulties in installation and color adjustment, etc.

As an alternative to such conventional lighting devices, much research has been focused on lighting devices using LED's (light emitting diodes). An LED has a semipermanent durability of about one hundred thousand hours, and since it uses light having a longer wavelength than that of ultraviolet rays, it is harmless to the human body.

LED's can be grouped, according to the wavelength of the light emitted, into blue LED's, white LED's, and ultraviolet LED's, etc. However, ultraviolet LED's and white LED's not only require complicated fabricating processes, but also incur much higher fabricating costs, such that their use is substantially limited. Thus, there is being developed a photoluminescent sheet for implementing white colors with inexpensive blue LED's. Such lighting equipment may be used for a backlight unit in a cell phone, etc.

However, since the conventional photoluminescent sheet is formed by kneading an inorganic phosphor with a thermoplastic resin as the matrix resin using a two-axis extruder, it is difficult to obtain uniform mixing of the phosphor in the resin sheet, which causes severe non-uniformity in luminance and color coordinates.

Also, since the conventional color conversion sheet was fabricated by extrusion molding a colored pellet, in which a matrix resin and a phosphor were kneaded, identical extrusion-molding conditions produced only identical forms of color conversion sheet, to result in low applicability.

Figure 1:
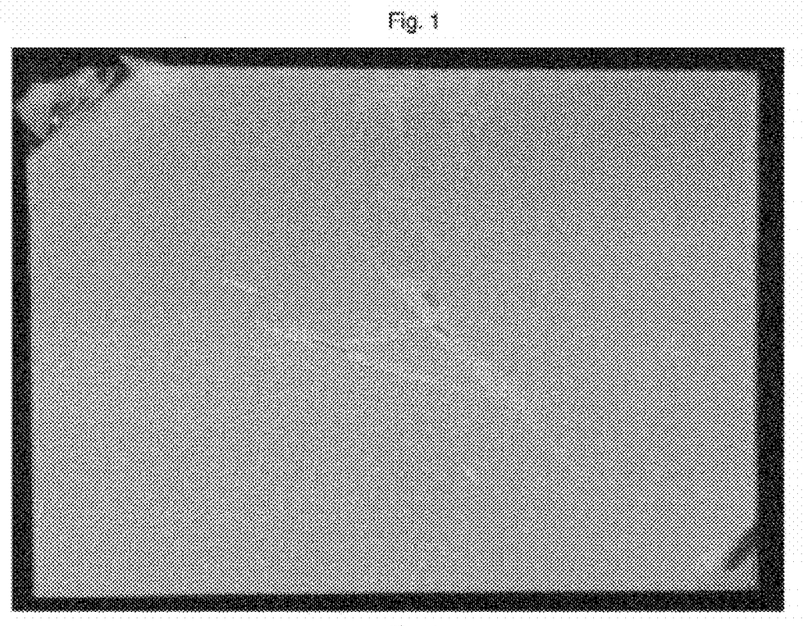
FIG. 1 is a photograph of a photoluminescent sheet according to prior art.

Furthermore, thermoplastic resins such as polycarbonate or polymethylmethacrylate resin, etc., used for the matrix resin were limited in application, because they are high in brittleness and may easily break, as in the photograph of FIG. 1, and because they are low in heat-resistance (120° C. or lower) and may easily undergo plastic deformation at high temperatures.

DETAILED DISCLOSURE

Technical Problem

An aspect of the present invention aims to provide a photoluminescent sheet which can implement white light using inexpensive blue LED's, and which has high resistance to heat, brittleness, and humidity.

Another aspect of the invention aims to provide a photoluminescent sheet in which the surface of the photoluminescent sheet is deformed for light diffusion, and in which wetting, which occurs due to contact when stacking with other sheets, is prevented.

Technical Solution

One aspect of the invention provides a photoluminescent sheet that includes a matrix resin layer, which is a thermosetting resin; a phosphor, which is included in the matrix resin layer and which converts the wavelength of light emitted from a blue LED; a curing agent, which is included in the matrix resin layer and which cures liquid thermosetting resin; and an additive, which is included in the matrix resin layer and which disperses the phosphor uniformly within the matrix resin layer.

The photoluminescent sheet may be fabricated, according to usage, as a luminance-enhancing photoluminescent sheet, luminance- and chromaticity-enhancing photoluminescent sheet, or a chromaticity-enhancing photoluminescent sheet. These may be fabricated in the following composition ratios.

When a diffusing agent is not included, a luminance-enhancing photoluminescent sheet may be fabricated to include 0.05~5 parts by weight of the curing agent, 0.1~15 parts by weight of the additive, and 1~90 parts by weight of the yellow phosphor, per 100 parts by weight of the silicone resin;

or a luminance- and chromaticity-enhancing photoluminescent sheet may be fabricated to include 0.05~5 parts by weight of the curing agent, 0.1~15 parts by weight of the additive, 1~30 parts by weight of the green phosphor, 0.1~60 parts by weight of the yellow phosphor, and 1~30 parts by weight of the red phosphor, per 100 parts by weight of the silicone resin.

Also, a chromaticity-enhancing photoluminescent sheet may be fabricated to include 0.05~5 parts by weight of the curing agent, 0.1~15 parts by weight of the additive, 1~65 parts by weight of the green phosphor, and 1~65 parts by weight of the red phosphor, per 100 parts by weight of the silicone resin.

Meanwhile, a diffusing agent may be added to the photoluminescent sheet, where the diffusing agent facilitates the refraction of light from the light source to increase the excitation rate of the phosphor and make it more uniform. Such a photoluminescent sheet may have the following composition ratios for various uses.

A luminance-enhancing photoluminescent sheet may be fabricated to include 0.05~5 parts by weight of the curing agent, 0.1~15 parts by weight of the additive, 5~15 parts by weight of the diffusing agent, and 1~90 parts by weight of the yellow phosphor, per 100 parts by weight of the silicone resin;

or a luminance- and chromaticity-enhancing photoluminescent sheet may be fabricated to include 0.05~5 parts by weight of the curing agent, 0.1~15 parts by weight of the additive, 5~15 parts by weight of the diffusing agent, 1~30 parts by weight of the green phosphor, 0.1~60 parts by weight of the yellow phosphor, and 1~30 parts by weight of the red phosphor, per 100 parts by weight of the silicone resin.

Also, a chromaticity-enhancing photoluminescent sheet may be fabricated to include 0.05~5 parts by weight of the curing agent, 0.1~15 parts by weight of the additive, 5~15 parts by weight of the diffusing agent, 1~50 parts by weight of the green phosphor, and 1~50 parts by weight of the red phosphor, per 100 parts by weight of the silicone resin.

Meanwhile, a protective film may be attached to a surface of the matrix resin layer. The protective film is a transparent layer, which protects the matrix resin layer for increased resistance to heat and humidity.

The surface of the protective film may have uneven levels. This is for the functions of diffusion and anti-wetting. Minute balls for preventing wetting may be attached to the surface of the protective film, to prevent wetting when another sheet is placed in contact with the photoluminescent sheet.

DESCRIPTION OF REFERENCE NUMERALS FOR KEY COMPONENTS

1a: yellow phosphor  1b: red phosphor
1c: green phosphor  1: phosphor
2: matrix resin layer  3: diffusing agent
4: protective film  5: minute ball
10: photoluminescent sheet  20: silicone liquid

MODE FOR THE INVENTION

Embodiments of the invention will be described below in more detail, with reference to the accompanying drawings, where the same reference numerals are used for the same or corresponding components, and redundant descriptions are omitted.

Figure 2:
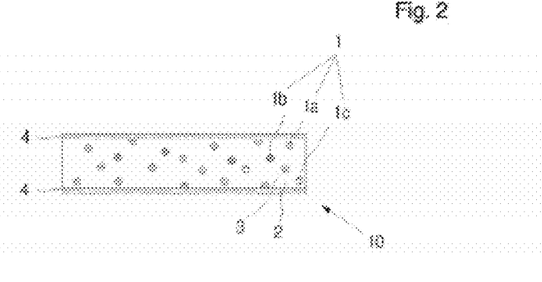
FIG. 2 is a cross-sectional view of a photoluminescent sheet according to a first disclosed embodiment of the present invention.

FIG. 2 is a cross-sectional view of a photoluminescent sheet according to a first disclosed embodiment of the present invention. In FIG. 2 are illustrated a yellow phosphor 1a, red phosphor 1b, green phosphor 1c, phosphor 1, matrix resin layer 2, diffusing agent 3, protective film 4, and photoluminescent sheet 10.

The photoluminescent sheet 10 shown in FIG. 2 has the function of transforming the light of a blue LED, having a wavelength of 400 nm~500 nm, into white light. Basically, it has the form of a thin matrix resin layer 2 having a phosphor dispersed within.

Although it is not shown in FIG. 2, a curing agent and an additive may be included inside the matrix resin layer 2. The curing agent is used for curing liquid thermosetting resin, and the additive is used for dispersing the phosphor uniformly within the liquid thermosetting resin. The diffusing agent 3 is for increasing the excitation rate of the phosphor and making it more uniform. The protective film 4 is for protecting the matrix resin layer 2.

The materials used in certain embodiments of the invention are described as follows.

Matrix Resin Layer 2

In embodiments of the invention, the matrix resin layer 2 is composed of a thermosetting resin, which may be a silicone resin. While thermoplastic resin is easy to handle, it is high in brittleness and low in humidity-resistance, making it difficult to use in a photoluminescent sheet 10. Thus, in embodiments of the invention, thermosetting resin is used, which involves more complicated processes.

Silicone resin has good flexibility, and has superior adhesion when printed on a film. Desirable properties for silicone resin applicable to an embodiment of the invention include a light transmittance of 85% or higher, a viscosity of 3000 cP or higher, and a drying (curing) temperature of 120° C. or lower. Also, adequate mixing with the phosphor 1, etc., may be preferable, as well as low volatility and good adhesion with the protective film 4. Such silicone resin is commercially available, for example, the silicone resin system of LS4326 (silicone resin)—LS4326A (curing agent)—LS4326C (curing accelerator)—toluene or xylene (70%, viscosity controller or solvent), or the silicone resin system of CF5010 (silicone resin)—SO400 (curing agent)—silicone oil (viscosity controller or solvent), etc., from Dow Corning Corporation.

Since such silicone resin generally has an antifoaming agent already added, the problem of bubbling, which may occur in screenprinting applications, can be resolved. Thus, the silicone resin generally referred to below may be regarded not so much as pure silicone resin, but as silicone resin containing small amounts of materials for improving the properties of the silicone resin. This is because it is difficult to obtain pure silicone resin in the market, and because silicone resin generally referred to by those skilled in the art is the kind sold by silicone resin manufacturers.

Phosphor 1 and Diffusing Agent 3

Materials mixed into the silicone resin for light excitation and/or diffusion are as follows.

An inorganic phosphor is used for the phosphor 1. A typical light-excitation inorganic phosphor is composed by doping $Y_3Al_{15}O_{12}$ (YAG) with cerium, where $Y_3Al_{15}O_{12}$ (YAG) is a material of the garnet group. For example, the light-excitation inorganic phosphor may be $(Y1-x-yGdxCey)3Al_5O_{12}$(YAG: Gd,Ce), $(Y1-xCex)_3Al_5O_{12}$(YAG:Ce), $(Y1-xCex)_3(All-y Gay)_5O_{12}$(YAG:Ga,Ce), $(Y1-x-yGdxCey)_3(Al5-zGaz)_5O_{12}$ (YAG:Gd,Ga,Ce), or $(Gdl-xCex)SC_2Al_3O_{12}$(GSAG), etc.

In general, a YAG-based phosphor is represented as $(Y1-x-yGdxCey)_3$ $(All-zGaz)O_{12}$ (where $x+y \leq 1$; $0 \leq x \leq 1$; $0 \leq y \leq 1$; $0 \leq z \leq 1$). The main wavelengths of the light emitted by the phosphor 1 vary according to the material set forth above. $Ce^{3+}$ light emission from a garnet composition can provide a variety of colors from green (~540 nm; YAG:Ga,Ce) to red (~600 nm; YAG:Gd,Ce), without losses in light efficiency. In an embodiment of the invention, $(Y, Gd, Ce)_3 (Al, Ga)_5O_{12}$ from Daejoo Electronic Materials Co. Ltd., and $Y_3Al_5O_{12}$ Ce from Phosphor Technology, Ltd., were used. Also, a typical inorganic phosphor for emitting dark red light is $SrB4O7$: $Sm^{2+}$. $SM^{2+}$ mainly contributes to producing wavelengths of a red color. This dark red inorganic phosphor in particular absorbs radiation from the entire visible light range of 600 nm or lower, and emits radiation having wavelengths of 650 nm or higher. For improved luminance, a SrS:Eu based phosphor of wavelengths around 620 nm from Phosphor Technology, Ltd., is used. Also, a typical inorganic phosphor for emitting green light is $SrGa_2S_4$:$Eu^{2+}$. This green inorganic phosphor absorbs light of 500 nm or lower, and emits radiation having a main wavelength of 535 nm. Also, a typical inorganic phosphor for emitting blue light is $BaMg_2Al_{16}O_{27}$:$Eu^{2+}$. This blue inorganic phosphor absorbs light of 430 nm or lower, and emits radiation having a main wavelength of 450 nm.

The yellow phosphor does not necessarily have to be YAG-based, and any one of TAG-based ($Tb_3Al_5O_{12}$) or Silicate-based ($Sr_2SiO_4$:Eu) phosphors may also be used. Further, the red phosphor may also be selected from among CaS:Eu, SrS:Eu, and $SrB_4O_7$:Sm, while the green phosphor may also be $SrGa_2S_4$:Eu.

The diffusing agent 3, which performs the function of scattering or diffusing light to make the light uniform, is divided mainly into a transparent diffusing agent and a white diffusing agent. Examples of a transparent diffusing agent include organic transparent diffusing agents such as acrylic resin, styrene resin, and silicone resin, etc., and inorganic transparent diffusing agents such as synthetic silica, glass beads, and diamond, etc. Typical examples of the white diffusing agent include silicon dioxide ($SiO_2$), titanium dioxide ($TiO_2$), zinc oxide (ZnO), barium sulfate ($BASO_4$), calcium sulfate ($CaSO_4$), magnesium carbonate ($MgCO_3$), aluminum hydroxide ($Al(OH)_3$), and inorganic oxides containing clay, etc.

The size and concentration of the diffusing agent 3 material are major factors that determine the degree of scattering of light emitted from a light source. If the diffusing agent 3 is too small in size, the light diffusion efficiency may be lowered, while too much of the diffusing agent ₃ may lower the light transmissivity. In an embodiment of the present invention, the best results were obtained with sizes of $SiO_2$ from 5 to 7 μm. Also, desirable results for light diffusion and transmissivity were obtained when the concentration of the diffusing agent 3 was 13%.

As in the case of the diffusing agent 3, the size of the phosphor 1 material is also restricted. A size of 5~7 μm may be suitable for the phosphor 1, as an excessively small size reduces the light excitation efficiency, while an excessively large size lowers the light transmissivity and uniformity of the thin film.

However, the diffusing agent 3 is not of critical importance, as it is possible to sufficiently diffuse light by deforming the surfaces of the photoluminescent sheet 10.

Protective Film 4

A colorless transparent synthetic resin, which has high light transmissivity, may be used for the protective film 4 in an embodiment of the invention, which includes, but is not limited to, polyethylene terephthalate (PET), polyethylene naphthalate, acrylic resin, polycarbonate, and polystyrene, etc. Among these, a polyethylene terephthalate (PET) film is superior in terms of transparency, and has high strength and flexibility. When heat resistance and chemical resistance are required, it may be preferable to use polycarbonate for the protective film 4. Preferably, a film having a thickness of 5~50 μm may be used for the protective film 4. This is because a film having a thickness of 5 μm or lower is difficult to handle, while a film having a thickness of 50 μm or higher has lower light transmissivity.

Meanwhile, since a polymer screen used in screenprinting is low in mechanical strength, it may be preferable to use a stainless-steel screen. The mesh size of the screen may be appropriately adjusted according to the printing thickness and grid size. In an embodiment of the invention, a screen having a mesh size of 50~120 was used.

Other Materials

A curing agent cures liquid-phase silicone. While various types of curing agents may be used, the CF5010, CD7657, DC9800, LS4326, and DC2013 products from Dow Corning Corporation are generally used.

Also, one or more solutions selected from a dispersing agent for dispersing the phosphor 1 within the liquid silicone, a surface-defect-preventing agent, and a fluidity-enhancing additive may be used as additives. When such additives are not used, the phosphor 1 lumps together, to decrease the efficiency of the photoluminescent sheet 10. Products from BYK Gmbh of Germany (BYK-333, BYK-306, BYK-310, BYK-w940, BYK-110, BYK-2001, BYK-410) are mainly used for the additives. Of course, any of a variety of products and substances may be used for the above curing agent and additives according to usage.

In addition, an anti-precipitating agent, a binder, or antifoaming agent, etc., may be used for better mixing between the liquid silicone resin and the phosphor 1 and optionally the diffusing agent 3, to fabricate a uniform sheet or to prevent the occurrence of bubbles.

The fabrication of a photoluminescent sheet 10, using the silicone resin, additives, and phosphor 1 set forth above will be described below, for the cases where a diffusing agent 3 is added and where a diffusing agent 3 is not added, for 100 parts by weight of the silicone resin.

Tables 1 and 2 list the composition ratios for photoluminescent sheets; Table 1 for the case of adding a diffusing agent, and Table 2 for the case of not using a diffusing agent.

TABLE 1

Composition Ratio of Photoluminescent Sheet with Diffusing Agent

| | Silicone (parts by weight) | Curing Agent | Additive | Diffusing Agent | GreenPhosphor | YellowPhosphor | RedPhosphor |
|---|---|---|---|---|---|---|---|
| Luminance-Enhancing Photoluminescent Sheet | 100 | 0.05-5 | 0.1-15 | 5-15 | 0 | 1-90 | 0 |
| Luminance- and Chromaticity-Enhancing Photoluminescent Sheet | 100 | 0.05-5 | 0.1-15 | 5-15 | 1-30 | 0.1-60 | 1-30 |
| Chromaticity-Enhancing Photoluminescent Sheet | 100 | 0.05-5 | 0.1-15 | 5-15 | 1-50 | 0 | 1-50 |

TABLE 2

Composition Ratio of Photoluminescent Sheet without Diffusing Agent

| | Silicone(parts by weight) | Curing Agent | Additive | GreenPhosphor | YellowPhosphor | RedPhosphor |
|---|---|---|---|---|---|---|
| Luminance-Enhancing Photoluminescent Sheet | 100 | 0.05-5 | 0.1-15 | 0 | 1-90 | 0 |
| Luminance- and Chromaticity-Enhancing Photoluminescent Sheet | 100 | 0.05-5 | 0.1-15 | 1-30 | 0.-60 | 1-30 |
| Chromaticity-Enhancing Photoluminescent Sheet | 100 | 0.05-5 | 0.1-15 | 1-65 | 0 | 1-65 |

As in Tables 1 and 2, three main types of photoluminescent sheet may be fabricated. Each of the photoluminescent sheets may be referred to, according to its characteristics, as a luminance-enhancing photoluminescent sheet, a luminance- and chromaticity-enhancing photoluminescent sheet, and a chromaticity-enhancing photoluminescent sheet.

The luminance-enhancing photoluminescent sheet uses only the yellow phosphor, among the various phosphors. Thus, when blue light is irradiated onto the photoluminescent sheet, the light that passes the yellow phosphor material displays a low peak at around 550 nm, which is the wavelength region of yellow light, while the blue light that does not pass the yellow phosphor material displays a high peak at around its original 450 nm. This arrangement of wavelengths provides enhanced luminance. On the other hand, since white light requires a suitable combination of red, green, and blue light, the light implemented by the luminance-enhancing photoluminescent sheet may be lacking in chromaticity.

However, since the light emitted from blue LED's generally does not have high luminance, it may be preferable to use a luminance-enhancing photoluminescent sheet to ensure maximum luminance for light passing the photoluminescent sheet.

When a diffusing agent is added, as in Table 1, the luminance-enhancing photoluminescent sheet may be fabricated including 0.05~5 parts by weight of the curing agent, 0.1~15 parts by weight of the additive, 5~15 parts by weight of the diffusing agent, and 1~90 parts by weight of the yellow phosphor, per 100 parts by weight of the silicone resin. When the diffusing agent is not added, as in Table 2, the luminance-enhancing photoluminescent sheet may be fabricated including 0.05~5 parts by weight of the curing agent, 0.1~15 parts by weight of the additive, and 1~90 parts by weight of the yellow phosphor, per 100 parts by weight of the silicone resin.

Meanwhile, the chromaticity-enhancing photoluminescent sheet is for implementing white light. In particular, the chromaticity-enhancing photoluminescent sheet is used in lighting devices, and this type of sheet may be preferable in indoor spaces for everyday living, in order to reduce fatigue to the eyes.

The chromaticity-enhancing photoluminescent sheet uses a green phosphor and a red phosphor, from among the various phosphors. White light is implemented when wavelengths of blue, green, and red colors are suitably combined. Thus, when blue light is irradiated onto the photoluminescent sheet, the light that passes the red phosphor material displays a peak at around the wavelengths for red colors, and the light that passes the green phosphor material displays a peak at around the wavelengths for green colors, while the blue light that does not pass any of the phosphor materials displays a peak at around the wavelengths for blue colors, such that the lights blend together to implement white light.

When a diffusing agent is added, as in Table 1, the chromaticity-enhancing photoluminescent sheet may be fabricated including 0.05~5 parts by weight of the curing agent, 0.1~15 parts by weight of the additive, 5~15 parts by weight of the diffusing agent, 1~50 parts by weight of the green phosphor, and 1~50 parts by weight of the red phosphor, per 100 parts by weight of the silicone resin.

When the diffusing agent is not added, the chromaticity-enhancing photoluminescent sheet may be fabricated including 0.05~5 parts by weight of the curing agent, 0.1~15 parts by weight of the additive, 1~65 parts by weight of the green phosphor, and 1~65 parts by weight of the red phosphor, per 100 parts by weight of the silicone resin.

The luminance- and chromaticity-enhancing photoluminescent sheet combines the advantages and disadvantages of the luminance-enhancing photoluminescent sheet and the chromaticity-enhancing photoluminescent sheet. That is, the luminance- and chromaticity-enhancing photoluminescent sheet has the advantage of increasing both the luminance and the chromaticity concurrently.

When a diffusing agent is added, the luminance- and chromaticity-enhancing photoluminescent sheet may be fabricated including 0.05~5 parts by weight of the curing agent, 0.1~15 parts by weight of the additive, 5~15 parts by weight of the diffusing agent, 1~30 parts by weight of the green phosphor, 0.1~60 parts by weight of the yellow phosphor, and 1~30 parts by weight of the red phosphor, per 100 parts by weight of the silicone resin.

When the diffusing agent is not added, the luminance- and chromaticity-enhancing photoluminescent sheet may be fabricated including 0.05~5 parts by weight of the curing agent, 0.1~15 parts by weight of the additive, 1~30 parts by weight of the green phosphor, 0.1~60 parts by weight of the yellow phosphor, and 1~30 parts by weight of the red phosphor, per 100 parts by weight of the silicone resin.

Figure 3:
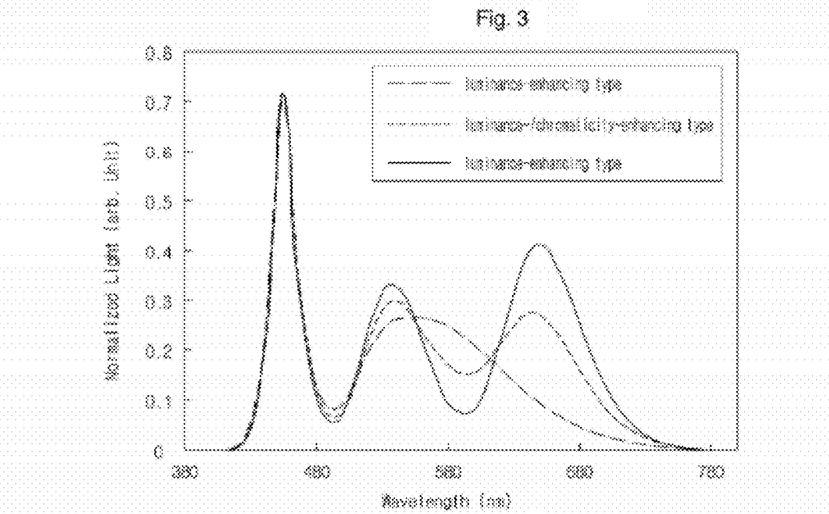
FIG. 3 is a photoluminescent spectra graph of three types of photoluminescent sheets according to a second disclosed embodiment of the present invention.

Analyzing the photoluminescent spectra of the three types of photoluminescent sheets set forth above may yield the graph shown in FIG. 3. As illustrated in FIG. 3, a peak is formed for the luminance-enhancing photoluminescent sheet across a broad range, while high peaks are formed in the blue, red, and green wavelength regions for the chromaticity-enhancing photoluminescent sheet.

Meanwhile, with respect to forming the three types of photoluminescent sheets set forth above, the reasons for limiting the composition ranges are explained below.

Effect of the Curing Agent

When the content of the curing agent is 0.05% or lower, there is almost no curing at all of the silicone resin after printing, and even when there is a curing effect, the curing time is increased to several hours or several days, to cause a lack of productivity. On the other hand, when the content of the curing agent is 5% or higher, the curing occurs too quickly, such that the curing may occur during the printing process for fabricating the photoluminescent sheet.

When the curing occurs too early, the curing may occur while the printing is being performed, such that the thickness of the photoluminescent sheet is increased. This may cause serious process changes of altered color coordinates, and may incur serious problems in the reproduction of the fabrication process.

Effect of the Additives

One or more of a dispersing agent, a surface-defect-preventing agent, and a fluidity-enhancing additive may be mixed in for use as additives. When the amount of additives is below 0.1 weight %, there may be serious separation and aggregation between phosphor material after the photoluminescent sheet is fabricated, to make it difficult to form a uniform surface light source, and when the amount of additives is 15 weight % or higher, reverse effects may occur, such as those listed below in Table 3.

TABLE 3

Types and Effects of Additives

| Type of Additive | Product Name | Effect | Reverse Effect when Used Excessively |
|---|---|---|---|
| Dispersing Agent | BYK110, 180, 12001 | prevents aggregation, reduction in luster, color changes, color separation, and precipitation, etc. | flowing effect on print surface (non-uniformity in film surface) |
| Surface-Defect-Preventing Agent | BYK310,333 | prevents color separation, surface fluidity, crater effect, surface slip foaming, etc. | delayed curing, weakened adhesion, and lowered surface fluidity, when used excessively, in the case of BYK333 |
| Fluidity-Enhancing Additive | BYK940,410 | prevents flow precipitation of surface | flowing effect on print surface |

As shown in Table 3, excessive use of the dispersing agent may create a flowing effect on the print surface, to cause non-uniformity in the surface of the film (photoluminescent sheet). In the case of the surface-defect-preventing agent, when the BYK333 is added in an excess amount, the curing may be delayed, the adhesion may be weakened, and the surface fluidity may be lowered, while in the case of the fluidity-enhancing additive, an excess amount may cause a flowing effect on the print surface.

Effect of the Diffusing Agent

Figure 4:
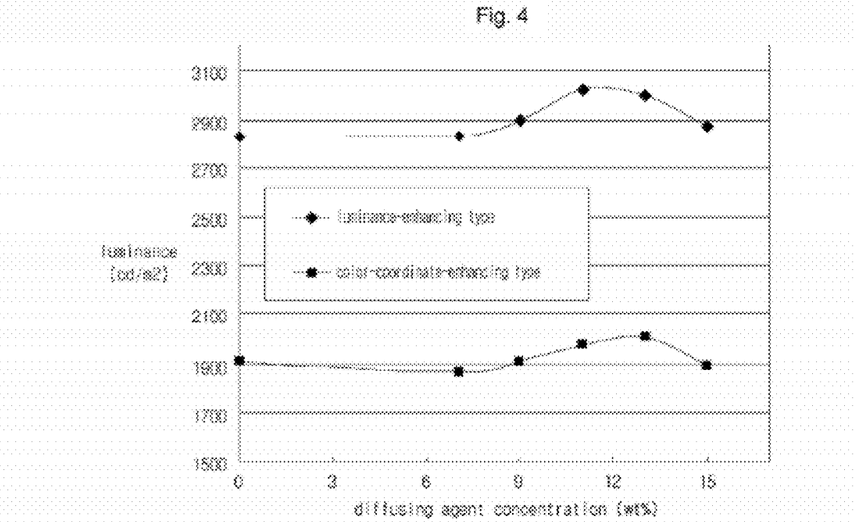
FIG. 4 is a graph illustrating the relation between diffusing agent concentration and luminance in a photoluminescent sheet according to a third disclosed embodiment of the present invention.

In the case where a diffusing agent is added in the sheet, the relation between the composition of the diffusing agent and luminance is as shown in Table 4 and the graph of FIG. 4. (Table 4 and the graph of FIG. 4 are results of experiments on the luminance-enhancing photoluminescent sheet and the chromaticity-enhancing photoluminescent sheet.)

When the amount of the diffusing agent is 5 parts by weight or less per 100 parts by weight of the silicone resin, there is almost no increasing effect at all on luminance, and when the amount is 15 parts by weight or more, there is a trend of decreasing luminance. Thus, a suitable amount may be selected from the range of 5~15 parts by weight.

TABLE 4

| Diffusing Agent Concentration (per 100 parts by weight of silicone resin) | Luminance-Enhancing Photoluminescent Sheet (cd/m$^2$) | Chromaticity-Enhancing Photoluminescent Sheet (cd/m$^2$) |
|---|---|---|
| 0 | 2830 | 1909 |
| 7 | 2831 | 1868 |
| 9 | 2898 | 1908 |
| 11 | 3021 | 1978 |
| 13 | 3001 | 2012 |
| 15 | 2871 | 1900 |

Effect of the Phosphor

As phosphors may have varying light emission and color coordinate properties according to the manufacturer, it is difficult to establish a fixed composition, and thus the phosphors have a wide range of compositions.

In the case of a luminance-enhancing photoluminescent sheet, there is almost no excitation of the phosphor material with less than 1 part by weight per 100 parts by weight of the silicone resin, and as the light from the blue LED light source occupies the major portion of the resulting light, the light is of a generally blue color. With 90 parts by weight or more, the color coordinates are beyond white and are more of a yellow shade, and while the greater content of phosphors typically lead to the higher luminance in the fabrication of phosphor sheets, there is almost no luminance increase for 90 parts by weight or more.

In the case of a luminance- and chromaticity-enhancing photoluminescent sheet, a composition of 1 part by weight of the green phosphor, 0.1 parts by weight of the yellow phosphor, and 1 part by weight of the red phosphor or less, per 100 parts by weight of the silicone resin, causes almost no excitation of the phosphor material at all, so that the light is of a generally blue color, and there is almost no luminance increase for 30 parts by weight of the green phosphor, 60 parts by weight of the yellow phosphor, and 30 parts by weight of the red phosphor or more.

In the case of a chromaticity-enhancing photoluminescent sheet, there is almost no excitation of the phosphor material with less than 1 part by weight of the green phosphor and 1 part by weight of the red phosphor per 100 parts by weight of the silicone resin, so that the light is of a generally blue color, and there is almost no luminance increase for 50 parts by weight of the green phosphor and 50 parts by weight of the red phosphor or more. When a diffusing agent is not used, the green phosphor may be used up to 65 parts by weight, and the red phosphor may be used up to 65 parts by weight.

Figure 5:
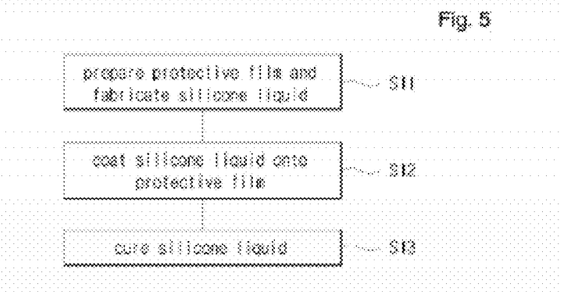
FIG. 5 is a flowchart illustrating a method of fabricating a photoluminescent sheet according to a fourth disclosed embodiment of the present invention.
Figure 6:
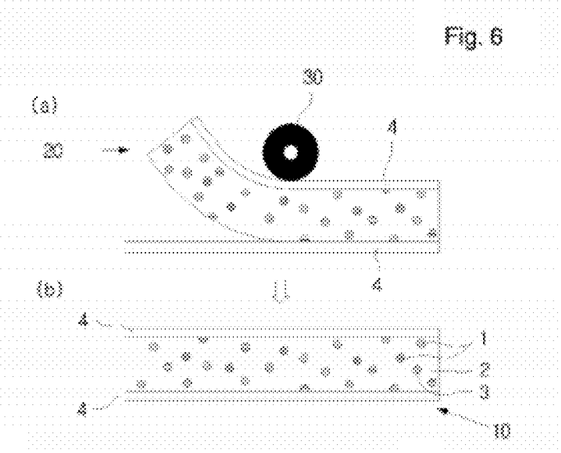
FIG. 6 is a schematic diagram illustrating a method of fabricating a photoluminescent sheet according to a fourth disclosed embodiment of the present invention.

A method of fabricating the photoluminescent sheet considering the range of composition ratios set forth above will be described below. FIG. 5 is a flowchart illustrating a method of fabricating a photoluminescent sheet according to a fourth disclosed embodiment of the present invention, and FIG. 6 is a schematic diagram illustrating a method of fabricating a photoluminescent sheet according to the fourth disclosed embodiment of the present invention. In FIG. 6 are illustrated a protective film 4, a photoluminescent sheet 10, and silicone liquid 20.

Method of Fabrication

The curing agent, the phosphor, and optionally the diffusing agent are mixed and stirred into the silicone resin of a gel form, and the viscosity is adjusted by means of silicone oil, etc., at which the silicone liquid is fabricated. Afterwards, it is printed onto the protective film by screenprinting, slit coating, or roll coating, etc., and dry-cured to fabricate the photoluminescent sheet 10. While the photoluminescent sheet 10 may also be used after removing the protective film 4, it is generally preferable to leave the protective film 4 attached, for protection.

Examining the Fabrication Method in More Detail

A liquid silicone resin was fabricated by sequentially adding the silicone resin, and 0.5 parts by weight of the curing agent and 2 parts by weight of the curing accelerator per 100 parts by weight of the silicone resin. For the liquid silicone resin fabricated in the manner set forth above, 13 parts by Weight of the phosphor and 13 parts by weight of $SiO_2$ (5~7 μm in diameter) as the diffusing agent were mixed into the liquid silicone resin and stirred using a revolving and orbiting stirrer to fabricate a silicone liquid 20. Next, the mixed silicone liquid described above was coated, using screenprinting, onto a protective film 4 (made of polyethylene) having a double-layer structure, of which the first layer has a thickness of 10~25 μm and the second layer has a thickness of 20~100 μm, as the printing surface. After curing in an infrared drier at 120° C., the protective film 4 was separated, to fabricate a photoluminescent sheet based on an embodiment of the invention.

However, instead of separating the protective film 4, another layer of protective film 4 may further be stacked. This may increase the heat- and humidity-resistance of the photoluminescent sheet 10.

Figure 7:
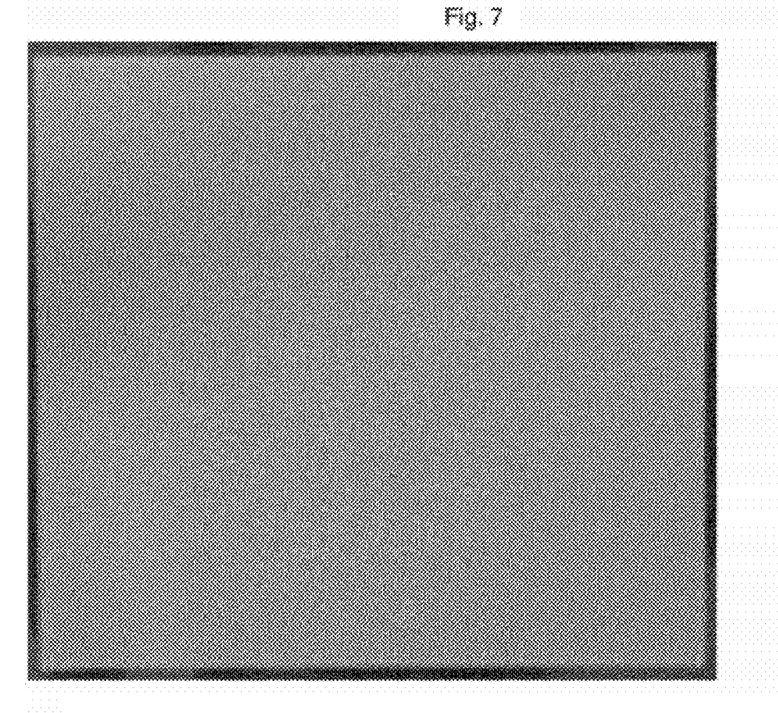
FIG. 7 is a photograph of a photoluminescent sheet according to a fourth disclosed embodiment of the present invention.

The photoluminescent sheet according to an embodiment of the invention has superior flexibility, such that it only bends and does not break. FIG. 7 is a photograph (without the protective film 4) of the photoluminescent sheet according to the fourth disclosed embodiment of the present invention, which shows how the photoluminescent sheet has no cracks on the surface.

Figure 8:
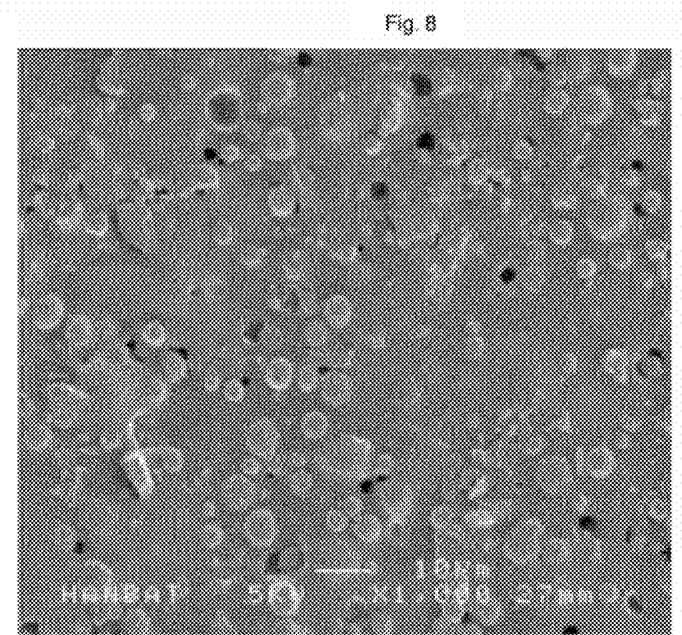
FIG. 8 is a photograph for reliability testing for a photoluminescent sheet according to prior art.

In prior art, a film was produced from thermoplastic resin by extruding and pulling, without a protective film. Reliability testing performed on such conventional thermoplastic resin in a high temperature (80~85° C.) and high humidity (80~85%) atmosphere provides the results shown in the photograph of FIG. 8. As in the photograph, the surface phosphors were separated and lost, while the phosphor material itself was also deteriorated, such that there was a serious reduction in luminance.

Figure 9:
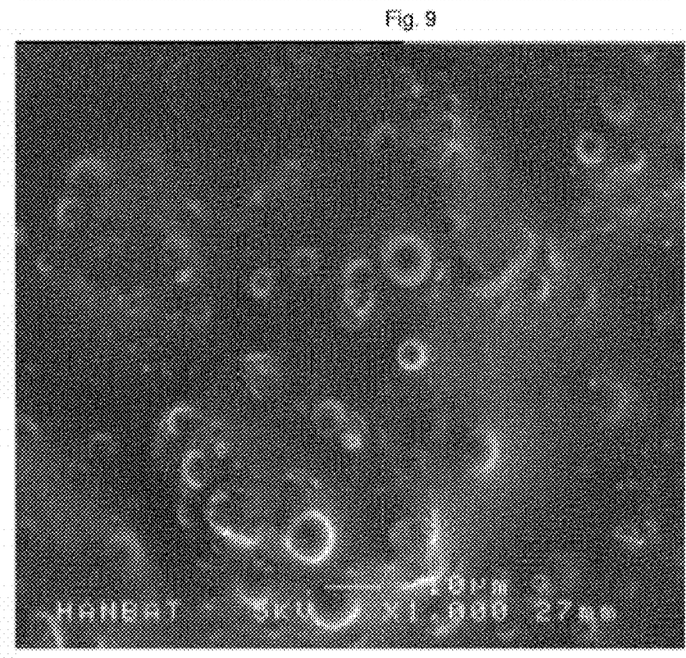
FIG. 9 is a photograph for reliability testing for a photoluminescent sheet according to a fourth disclosed embodiment of the present invention.

However, with the present embodiment, silicone resin was used, which is a kind of thermosetting resin, the results of which are no losses or deterioration of surface phosphors, as seen in the photograph of FIG. 9, and thus almost no reduction in luminance.

Moreover, when a protective film 4 was stacked, there were no deterioration or reduction in luminance even in a high temperature and high humidity environment.

Meanwhile, when a sheet of a different type from the photoluminescent sheet is stacked, the sheets adhere together to cause a wetting phenomenon. Therefore, there may be a need to separate each of the sheets by a minute distance. An embodiment will be described below which provides an improvement in this matter.

Figure 10:
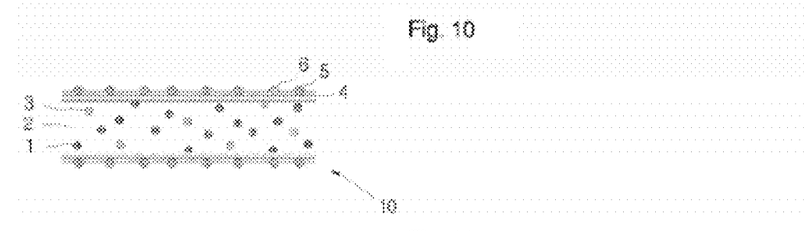
FIG. 10 is a cross-sectional view of a photoluminescent sheet according to a fifth disclosed embodiment of the present invention.
Figure 11:
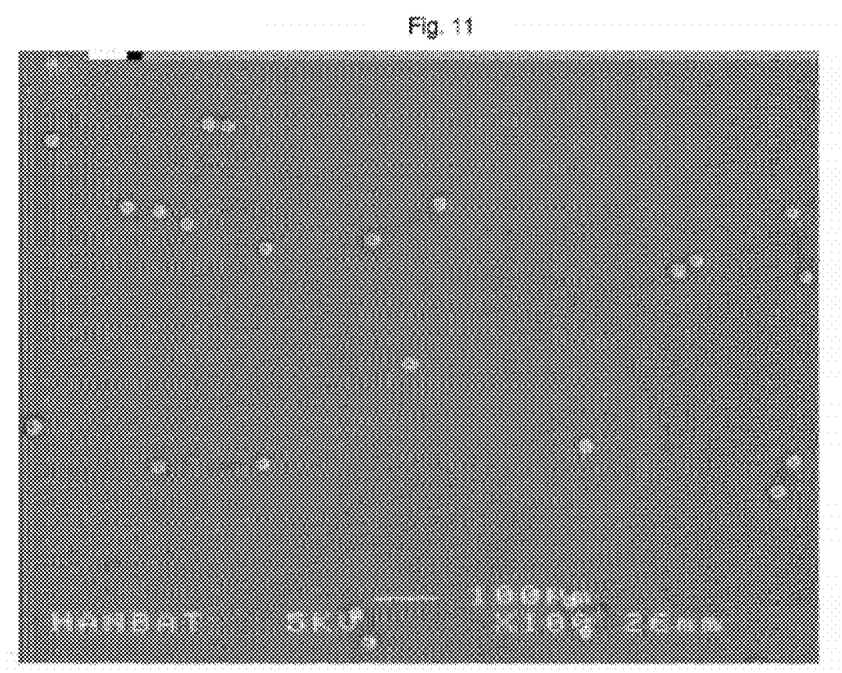
FIG. 11 is a photograph of a photoluminescent sheet having minute balls attached, according to a fifth disclosed embodiment of the present invention.

FIG. 10 is a cross-sectional view of a photoluminescent sheet according to a fifth disclosed embodiment of the present invention, and FIG. 11 is a photograph of the photoluminescent sheet having minute balls attached, according to the fifth disclosed embodiment of the present invention. In FIG. 10 are illustrated a phosphor 1, a matrix resin layer 2, a diffusing agent 3, protective films 4, minute balls 5, attachment layers 6, and a photoluminescent sheet 10.

The fifth disclosed embodiment of the invention is characterized by attaching minute balls 5 on the surfaces of the photoluminescent sheet 10. When the minute balls 5 are evenly dispersed and attached on the surfaces of the photoluminescent sheet 10, the wetting phenomenon caused by close adhesion of the surfaces may be avoided, even when different types of sheets are placed on the upper and lower surfaces.

Preferably, the minute balls 5 may also be made from resin, and it may be preferable to use a transparent material, so as not to lower the luminance. While the minute balls 5 may be attached directly on the surfaces of the photoluminescent sheet 10, coating an attachment layer 6 on the outer surface may prevent the minute balls 5 from becoming detached and may allow a stable manner of attachment.

FIG. 11 is a photograph seen from above of the fifth disclosed embodiment of the invention, where minute balls are dispersed over and attached onto the surface of the photoluminescent sheet.

Figure 12:
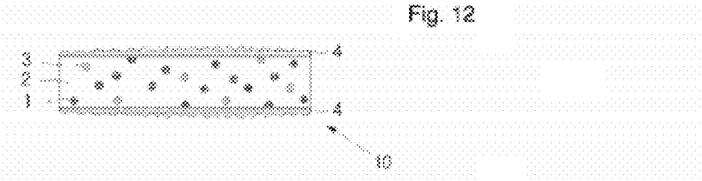
FIG. 12 is a cross-sectional view of a photoluminescent sheet according to a sixth disclosed embodiment of the present invention.

FIG. 12 is a cross-sectional view of a photoluminescent sheet according to a sixth disclosed embodiment of the present invention. In FIG. 12 are illustrated a phosphor 1, a matrix resin layer 2, a diffusing agent 3, protective films 4, and a photoluminescent sheet 10.

In the sixth disclosed embodiment, the surfaces of the protective film 4 have been treated to have roughness. This is in order to effectively diffuse light. That is, light incident on the matrix resin layer 2 passes a protective film 4 twice, where the roughness of the protective films 4 allows the paths of the light to be widely dispersed. Thus, this photoluminescent sheet 10 may be used without a diffusion agent 3. In addition, the rough surface of the protective film 4 also prevents the wetting phenomenon caused by close adhesion of the surfaces, when a different type of sheet is placed on the outer surfaces.

Figure 13:
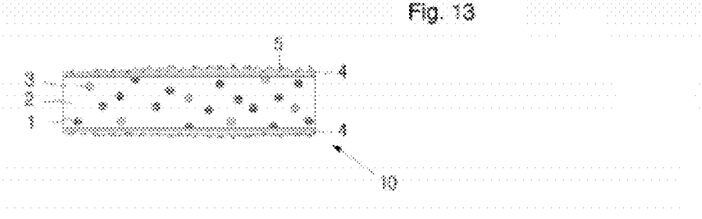
FIG. 13 is a cross-sectional view of a photoluminescent sheet according to a seventh disclosed embodiment of the present invention.

FIG. 13 is a cross-sectional view of a photoluminescent sheet according to a seventh disclosed embodiment of the present invention. A phosphor 1, a matrix resin layer 2, a diffusing agent 3, protective films 4, minute balls 5, and a photoluminescent sheet 10 are illustrated. In this embodiment, minute balls 5 are attached on the outer surfaces of the protective films 4, which are made to have roughness, as in the sixth disclosed embodiment of FIG. 12, to enhance the function of preventing wetting.

While the present invention was described in detail with reference to the particular embodiments, the embodiments are merely for the purpose of illustration, and are not to limit the invention. It is to be appreciated by those skilled in the art that various embodiments may be conceived without departing from the spirit of the present invention.

INDUSTRIAL APPLICABILITY

According to aspects of the invention set forth above, a photoluminescent sheet is provided which can reliably implement white light from the light of blue LED's.

What is claimed is:

1. A photoluminescent sheet comprising:
a resin layer;
a phosphor configured to convert a wavelength of light emitted from an LED in the resin layer;
a first protective film of uniform thickness on a top surface of the resin layer, wherein the first protective film is formed of a transparent synthetic resin; and
a second protective film of uniform thickness on a bottom surface of the resin layer, wherein the second protective film is formed of a transparent synthetic resin;
wherein the resin layer is interposed between the first protective film and the second protective film, and
wherein the first protective film and the second protective film comprise at least one same material.

2. The photoluminescent sheet of claim 1, further comprising: a diffusing agent configured to refract light in the resin layer.

3. The photoluminescent sheet of claim 2, wherein the phosphor comprises a yellow phosphor, and
wherein the photoluminescent sheet comprises 0.05~5 parts by weight of a curing agent, 0.1~15 parts by weight of an additive configured to disperse the phosphor in the resin layer, 5~15 parts by weight of the diffusing agent, and 1~90 parts by weight of the yellow phosphor, per 100 parts by weight of the resin layer.

4. The photoluminescent sheet of claim 2, wherein the phosphor comprises a green phosphor, a yellow phosphor, and a red phosphor, and
wherein the photoluminescent sheet comprises 0.05~5 parts by weight of a curing agent, 0.1~15 parts by weight of an additive configured to disperse the phosphor in the resin layer, 5~15 parts by weight of the diffusing agent, 1~30 parts by weight of the green phosphor, 0.1~60 parts by weight of the yellow phosphor, and 1~30 parts by weight of the red phosphor, per 100 parts by weight of the resin layer.

5. The photoluminescent sheet of claim 2, wherein the phosphor comprises a green phosphor and a red phosphor, and
wherein the photoluminescent sheet comprises 0.05~5 parts by weight of a curing agent, 0.1~15 parts by weight of an additive configured to disperse the phosphor in the resin layer, 5~15 parts by weight of the diffusing agent, 1~50 parts by weight of the green phosphor, and 1~50 parts by weight of the red phosphor, per 100 parts by weight of the resin layer.

6. The photoluminescent sheet of claim 1, wherein the resin layer is formed of thermosetting resin.

7. The photoluminescent sheet of claim 1, wherein the resin layer comprises a silicone resin.

8. The photoluminescent sheet of claim 1, wherein the phosphor comprises a yellow phosphor, and
wherein the photoluminescent sheet comprises 0.05~5 parts by weight of a curing agent, 0.1~15 parts by weight of an additive configured to disperse the phosphor in the resin layer, and 1~90 parts by weight of the yellow phosphor, per 100 parts by weight of the resin layer.

9. The photoluminescent sheet of claim 1, wherein the phosphor comprises a green phosphor, a yellow phosphor, and a red phosphor, and
wherein the photoluminescent sheet comprises 0.05~5 parts by weight of a curing agent, 0.1~15 parts by weight of an additive configured to disperse the phosphor in the resin layer, 1~30 parts by weight of the green phosphor, 0.1~60 parts by weight of the yellow phosphor, and 1~30 parts by weight of the red phosphor, per 100 parts by weight of the resin layer.

10. The photoluminescent sheet of claim 1, wherein the phosphor comprises a green phosphor and a red phosphor, and
wherein the photoluminescent sheet comprises 0.05~5 parts by weight of a curing agent, 0.1~15 parts by weight of an additive configured to disperse the phosphor in the resin layer, 1~65 parts by weight of the green phosphor, and 1~65 parts by weight of the red phosphor, per 100 parts by weight of the resin layer.

11. The photoluminescent sheet of claim 1,
wherein at least one of the first and second protective films is formed of PET, polyethylene naphthalate, acrylic resin, polycarbonate, or polystyrene.

12. The photoluminescent sheet of claim 11, further comprising a third protective film on at least one of the first and second protective films.

13. The photoluminescent sheet of claim 11, further comprising:
balls on at least one of the first and second protective films; and
an attachment layer for attaching the balls to at least one of the first and second protective films.

14. A photoluminescent sheet comprising:
a matrix layer having top and bottom surfaces that are substantially parallel to each other;
a phosphor configured to convert a wavelength of light in the matrix layer;
a first layer directly on a top surface of the matrix layer, wherein the first layer is formed of a material; and
a second layer directly on a bottom surface of the matrix layer, wherein the second layer is formed of a material,
wherein top surfaces of the first and second layers are substantially parallel to the top and bottom surfaces of the matrix layer, respectively,
wherein the matrix layer is thicker than the first layer or the second layer,
wherein ends of the matrix layer and the second layer are aligned with each other, wherein the matrix layer is interposed between the first layer and the second layer, and wherein the first layer and the second layer comprise at least one same material.

15. The photoluminescent sheet of claim 14, wherein the matrix layer comprises a silicone resin.

16. The photoluminescent sheet of claim 14, wherein the first and second layers are for protecting the matrix layer and comprise a transparent synthetic resin.

17. A light device comprising:
   a light emitting diode; and
   a conversion member configured to convert a wavelength of light emitted from the light emitting diode,
   wherein the conversion member comprises,
      a matrix layer having top and bottom surfaces that are substantially parallel to each other;
      a phosphor configured to convert a wavelength of light emitted from the light emitting diode in the matrix layer;
      a first layer directly on a top surface of the matrix layer, wherein the first layer is formed of a material; and
      a second layer directly on a bottom surface of the matrix layer, wherein the second layer is formed of a material,
   wherein top surfaces of the first and second layers are substantially parallel to the top and bottom surfaces of the matrix layer, respectively,
   wherein the matrix layer is thicker than the first layer or the second layer,
   wherein ends of the matrix layer and the second layer are aligned with each other,
   wherein the matrix layer is interposed between the first layer and the second layer, and
   wherein the first layer and the second layer comprise at least one same material.

18. The light device of claim 17, wherein the matrix layer comprises a silicone resin.

19. The light device of claim 17, wherein the first and second layers are for protecting the matrix layer and comprise a transparent synthetic resin.

* * * * *